United States Patent [19]

Caspi

[11] Patent Number: 5,774,572
[45] Date of Patent: Jun. 30, 1998

[54] AUTOMATIC VISUAL INSPECTION SYSTEM

[75] Inventor: Amiran Caspi, Rehovot, Israel

[73] Assignee: Orbotech Ltd., Yavne, Israel

[21] Appl. No.: 61,344

[22] Filed: May 17, 1993

Related U.S. Application Data

[63] Continuation of Ser. No. 961,070, Oct. 14, 1992, abandoned, which is a continuation of Ser. No. 804,511, Dec. 10, 1991, abandoned, which is a continuation of Ser. No. 684,583, Dec. 20, 1984, abandoned.

[51] Int. Cl.[6] .................................................... G06K 9/00
[52] U.S. Cl. ............................................................ 382/141
[58] Field of Search ........................ 364/724.12, 728.05, 364/728.03; 358/137, 140; 382/141, 199, 276, 278, 298, 254

[56] References Cited

U.S. PATENT DOCUMENTS

| 4,048,485 | 9/1977 | Nussbaumer | 364/728 |
|---|---|---|---|
| 4,259,661 | 3/1981 | Todd | 382/42 |
| 4,303,947 | 12/1981 | Stoffer | 382/41 |
| 4,330,833 | 5/1982 | Pratt et al. | 382/42 |
| 4,442,542 | 4/1984 | Lin et al. | 382/8 |
| 4,472,786 | 9/1984 | Larson | 364/822 |
| 4,555,770 | 11/1985 | Sage | 364/819 |
| 4,570,180 | 2/1986 | Baier et al. | 382/22 |
| 4,578,812 | 3/1986 | Yui | 382/41 |
| 4,658,372 | 4/1987 | Witkin | 364/572 |

OTHER PUBLICATIONS

Edge and Region Analysis for Digital Image Data, Robert M. Haralick, pp. 60–73.
Superresolving image restoration using linear programming, R. Mammone and G. Eichmann, vol. 21, No. 3 Feb. 01, 1982, pp. 496–501.
Precision bounds in superresolution processing, Lawrence S., Joyce and William L. Rott, vol. 1, No. 2 Feb. 1984.
A Survey of Edge Detection Techniques, Larry S. Davis, (1975) pp. 248–270.
An Optimal Frequency Domain Filter For Edge Detection In Digital Pictures; K. Sam Shanmugam et al, IEEE Transaction On Pattern Analysis And Machine Intelligence, vol. PAMI–1, No. 1, Jan. 1979.pp.37–49.
Theory Of Edge Detection; D. Marr et al, Proceeding Of Royal Society, 8207; pp. 187–217 (1990).
"Theory of Edge Detection", Proc. R. Soc. Lond., vol. 8207 (1980), pp. 187–212 by Marr and Hildreth.
"Finding Edges and Lines in Images" by John F. Canny.
Okuyama, H. et al, "High–speed digital image processor with special–purpose hardware for two–dimensional convolution," Rev. Sci. Instrum., vol. 50, No. 10, Oct. 1979, pp. 1208–1212.
"Automatic Visual Inspection Of PC Boards in Seconds", Published on May 1, 1984.
"A Very High Speed, Very Versitile Automatic PCB Inspection System", By Shimon Ullman, Presented in Wash. DC, May 22–25, 1984.

Primary Examiner—Jose L. Couso
Attorney, Agent, or Firm—Greenblum & Bernstein, P.L.C.

[57] ABSTRACT

A binary map of an object having edges is produced by first producing a digital grey scale image of the object with a given resolution, and processing the grey scale image to produce a binary map of the object at a resolution greater than said given resolution. Processing of the grey scale image includes the step of convolving the 2-dimensional digital grey scale image with a filter function related to the second derivative of a Gaussian function forming a 2-dimensional convolved image having signed values. The location of an edge in the object is achieved by finding zero crossings between adjacent oppositely signed values. Preferably, the zero crossings are achieved by an interpolation process that produces a binary bit map of the object at a resolution greater than the resolution of the grey scale image. The nature of the Gaussian function whose second derivative is used in the convolution with the grey scale image, namely its standard deviation, is empirically selected in accordance with system noise and the pattern of the traces on the printed circuit board such that the resulting bit map conforms as closely as desired to the lines on the printed circuit board.

67 Claims, 5 Drawing Sheets

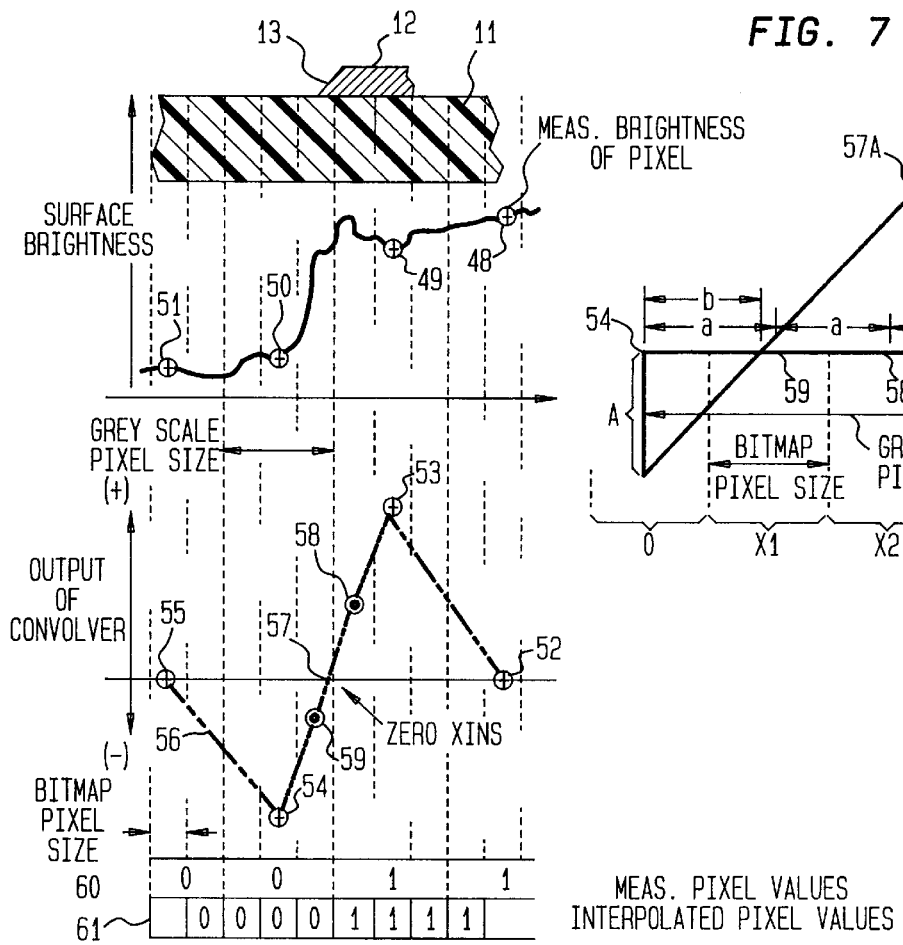
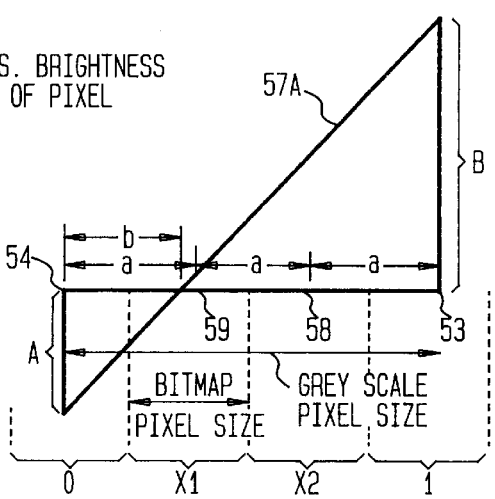
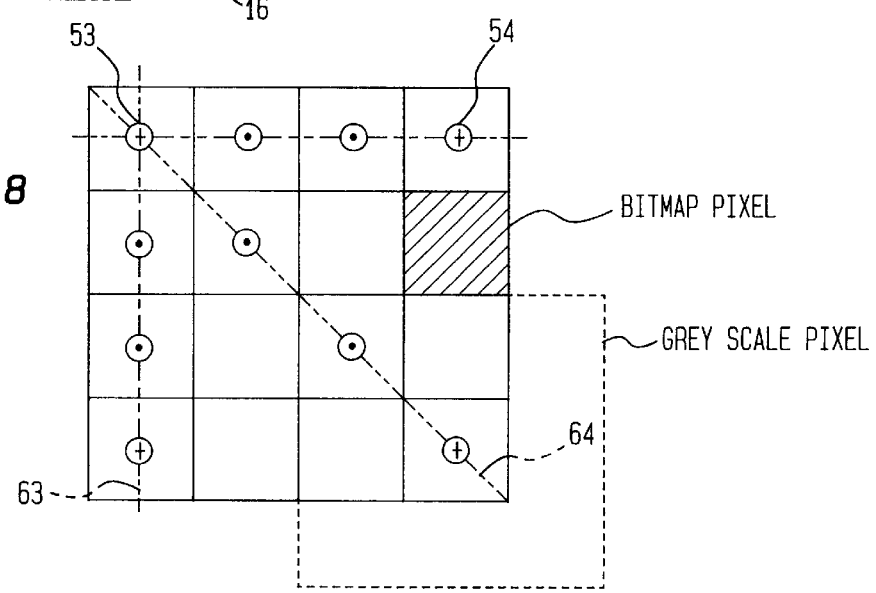

AUTOMATIC VISUAL INSPECTION SYSTEM

This application is a continuation of application Ser. No. 07/961,070, filed Oct. 14, 1992, now abandoned, which is a continuation of application Ser. No. 07/804,511, filed Dec. 10, 1991, now abandoned; which is a continuation of application Ser. No. 06/684,583, filed Dec. 20, 1984, now abandoned.

TECHNICAL FIELD OF THE INVENTION

This invention relates to automatic visual inspection systems, more particularly to systems for inspecting printed circuit boards, hybrid boards, and integrated circuits.

BACKGROUND OF THE INVENTION

In its simplest form, a printed circuit board or panel comprises a non-conductive substrate on one or both surfaces of which are deposited conductive tracks or lines in a pattern dictated by the design of the electronic equipment supported by the board. More complex boards are constructed by laminating a number of single panels into a composite or multi-layered board; and the use of the latter has increased dramatically in recent years in an effort to conserve space and weight.

As component size has shrunk, component density on boards has increased with the result that line size and spacing have decreased over the years. Because of the "fine geometry" of modern boards, variations in line width and spacing have become more critical to proper operation of the boards. That is to say, minor variations in line thickness or spacing have a much greater chance to adversely affect performance of the printed circuit board. As a consequence, visual inspection, the conventional approach to quality control, has employed visual aids, such as magnifiers or microscopes, to detect defects in a board during its manufacture. Such defects would include line width and spacing, pad position relative to hole location, etc. Unfortunately, visual inspection is a time consuming, tedious task that causes operator fatigue and consequential reduction in consistancy and reliability of inspection, as well as throughput.

Because multi-layered boards cannot be tested electrically before lamination, visual inspection of the component panels of a multi-layered board before lamination is critical. A flaw in a single layer of an assembled board can result in scrapping of the entire board, or involve costly, and time consuming rework. Thus, as board complexity and component density and production requirements have increased, automation of manufacturing processes has been undertaken. However, a larger and larger fraction of the of producing boards lies in the inspection of the boards during various stages of manufacture.

Automatic visual inspection techniques have been developed in response to industry needs to more quickly, accurately and consistently inspect the printed circuit boards. Conventional systems include an electro-optical sub-system that intensely illuminates a board being inspected along a narrow strip perpendicular to the linear displacement of the board through the system, and a solid state camera that converts the brightness of each elemental area of the illuminated strip, termed a pixel, to a number representative of such brightness; and the number is stored in a digital memory. Scanning of the entire board is achieved by moving the board relative to the camera. The result is a grey scale image of the board, or part of the board stored in memory. A relatively small number in a cell of the memory represents a relatively dark region of the object (i.e., the substrate), and a relatively large number represents a brighter portion of the object, (i.e., a conductive line).

The contents of the memory are processed for the purpose of determining the location of transitions between bright and dark regions of the object. Such transitions represent the edges of lines and the processing of the data in the digital memory is carried out so as to produce what is termed a binary bit map of the object which is a map of the printed circuit board in terms of ZERO's and ONE's, where the ONE's trace the lines on the printed circuit board, and the ZERO's represent the substrate. Line width and spacing between lines can then be carried out by analyzing the binary map.

The time required to scan a given board, given a camera with a predetermined data processing rate, typically 10–15 MHz, will depend on the resolution desired. For example, a typical camera with an array of 2048 photodiodes imaging a board is capable of scanning a one inch swath of the board in each pass if a resolution of ½ mil is required. At 0.5 mil resolution, a swath one inch wide and 24 inches long is composed of 96 million pixels. Assuming camera speed of 10 MHz, about 10 seconds would be required for completing one pass during which data from one swath would be acquired. If the board were 18 inches wide, then at least 18 passes would be required to complete the scan of the board. More than 18 passes is required, however, to complete a scan of the board because an overlap of the passes is required to insure adequately covering the "seams" between adjacent passes. Combined with overhead time required, e.g., the time required to reposition the camera from swath to swath, data acquisition time becomes unacceptably large under the conditions outlined above.

The basic problems with any automatic visual inspection system can be summarized in terms of speed of data acquisition, amount of light to illuminate the board, and the depth of field of the optical system. Concomitant with increased requirements for reducing pixel size (i.e., increasing resolution) is an increase in the amount of light data acquisition. Physical constraints limit the amount of light that can be concentrated on the printed circuit boards so that decreasing the pixel size to increase resolution and detect variations in line width or spacing of "fine geometry" boards, actually slows the rate of data acquisition. Finally, decreasing pixel size, as resolution is increased, is accompanied by a reduction in the depth of field which adversely affects the accuracy of the acquired data from board to board.

It is therefore an object of the present invention to provide a new and improved automatic visual inspection system which is capable of acquiring data faster than conventional automatic visual inspection systems, and/or reducing the amount of illumination required for the board, and increasing the depth of field.

BRIEF DESCRIPTION OF INVENTION

According to the present invention, a binary map of an object having edges is produced by first producing a digital grey scale image of the object with a given resolution, and processing the grey scale image to produce a binary map of the object at a resolution greater than said given resolution. If the ultimate resolution required is, for example, one mil (0.001 inches), then, the resolution of the digital grey scale image can be considerably less than one mil, and may be, for example, three mils. The larger than final pixel size involved in acquiring data from an object permits objects to be scanned faster, and either reduces the amount of light required for illuminating the object or permits the same amount of light to be used thus decreasing the effect on accuracy of noise due to statistical variations in the amount of light. Finally, increasing the pixel size during data acquisition improves the depth of field and renders the system less sensitive to variations in the thickness of the boards being tested.

Processing of the grey scale image includes the step of convolving the 2-dimensional digital grey scale image with a filter function related to the second derivative of a Gaussian function forming a 2-dimensional convolved image having signed values. The location of an edge in the object is achieved by finding zero crossings between adjacent oppositely signed values. Preferably, the zero crossings are achieved by an interpolation process that produces a binary bit map of the object at a resolution greater than the resolution of the grey scale image. The nature of the Gaussian function whose second derivative is used in the convolution with the grey scale image, namely its standard deviation, is empirically selected in accordance with system noise and the pattern of the traces on the printed circuit board such that the resulting bit map conforms as closely as desired to the lines on the printed circuit board.

The convolution can be performed with a difference-of-two-Gaussians, one positive and one negative. It may be achieved by carrying out a one-dimensional convolution of successive lines of the grey scale image to form a one-dimensional convolved image, and then carrying out an orthogonal one-dimensional convolution of successive lines of the one-dimensional convolved image to form a two-dimensional convolved image. Each one-dimensional image may be formed by multiple convolutions with a boxcar function.

Detection of the presence of lines less than a predetermined minimum width can be accomplished, independently of the attitude of the lines in the bit map by superimposing on an edge of a line, a quadrant of a circle whose radius is the minimum line thickness. By ANDing the contents of pixels in the bit map with ONE's in the corresponding pixels in the superposed quadrant, the production of a ZERO indicates a line width less than the predetermined width. A similar approach can be taken to detect line spacings less than a predetermined minimum. One quadrant is used for lines and spaces whose orientations on the board lies between 0° and 90°, and another quadrant is used for orientations between 90° and 180°.

BRIEF DESCRIPTION OF DRAWINGS

An embodiment of the present invention is shown in the accompanying drawings wherein:

FIG. 6 is a composite view similar to that of FIG. 4 but illustrating the variation in grey scale values resulting from an edge of a line on a printed circuit board, and showing the distribution of the signed values of the convolved image as well as the values of the bits assigned to the bit map for both the measured and interpolated pixel values;

FIG. 7 is a sketch illustrating the manner for identifying the pixel containing the zero crossing between adjacent oppositely signed values of the convolved image;

FIG. 8 is a plan view of a number of pixels illustrating how the interpolation process is carried out in two-dimensions;

DETAILED DESCRIPTION

Figure 1:
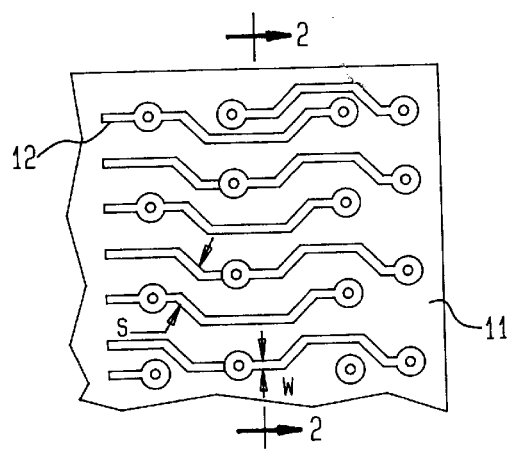
FIG. 1 is a plan view of a segment of a typical printed circuit board.
Figure 2:
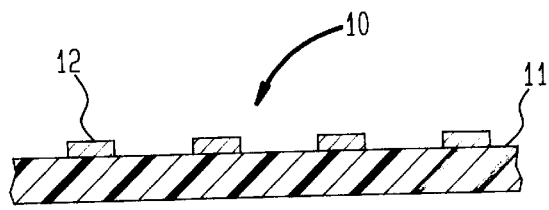
FIG. 2 is a section taken along the line 2—2 of FIG. 1 showing a cross section of the printed circuit board in FIG. 1.

Referring now to the drawing, reference numeral 10 designates a conventional printed circuit board comprising substrate 11 on one surface of which are deposited conductive tracks or lines 12 in a manner well known in the art. A typical board may have 3 mil lines, and spacing between lines of a comparable dimension.

Figure 3:
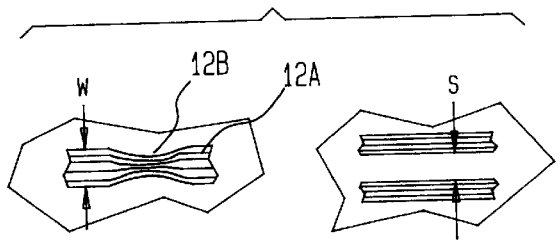
FIG. 3 shows two portions of a printed circuit board for the purpose of illustrating a line of reduced width and for illustrating the spacing between adjacent lines.

As is well known, the technique of depositing lines 12 on substrate 11 involves a photographic and etching process which may produce a result shown in FIG. 3 where line 12a, of width w has a reduced portion at 12b. The cross section available for conduction in reduced portion 12b may be insufficient to permit proper operation of the electronic components associated with the printed circuit board; and for this reason a board having a line of a width less than some predetermined value would be rejected, or at least noted. As boards get more and more complex, detecting breaks in lines, or lines with reduced width, becomes more and more difficult.

The photoetching process involved in producing lines on a printed circuit board sometimes results in the spacing s being less that the design spacing. In such case, quality control should reject the board or note the occurrence of a line spacing less than the specified line spacing.

Figure 4:
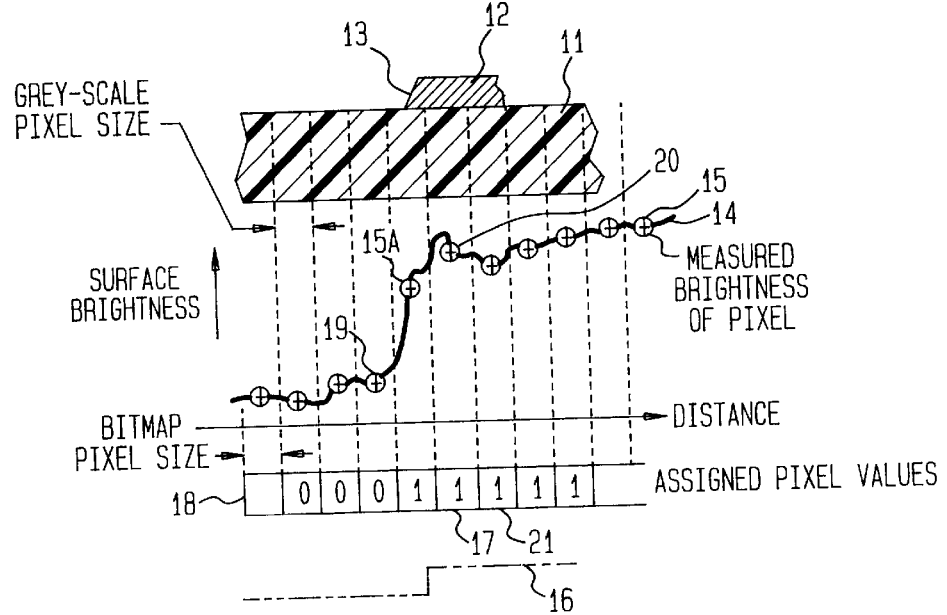
FIG. 4 is a composite view of a portion of a grey scale image of a printed circuit board for the purpose of showing the effect of an edge on the grey scale image, and showing the bit map values for the section illustrated.

In order to achieve these and other ends, conventional automatic visual inspection systems will produce the results shown in FIG. 4. That is to say, a grey scale image of the printed circuit board will be obtained and stored in a digital memory, the resolution of the grey scale image being selected to be consistent with the accuracy with which measurements in the image are to be made. Thus, if the requirement is for measuring the edge 13 of a trace to within say 1 mil, then the resolution of the grey scale image should be less than that, say 0.5 mil.

Curve 14 in FIG. 4 illustrates the variation in brightness of pixels measured by the electro-optical system of a conventional visual inspection system, the continuous analog values designated by curve 14 being converted to discrete values by a sampling process which stores a number in a homologous cell of a digital memory. The discrete values are indicated by circled-pluses in FIG. 4 and are designated by reference numerals 15. Typically, due to noise and statistical variations in the amount of light incident on the printed circuit board, and other factors, edge 13 will cause curve 14 to vary continuously from a generally lower level indicated by data points 19 to a generally upper level as indicated by data points 20, rather than to jump, in a discontinuous manner, from one level to the other. Thus, edge 13 is not sharply defined.

Conventionally, an algorithm is used for the purpose of determining within which pixel an edge will fall and this is illustrated by the assigned pixel values in vector 18 as shown in FIG. 4. That is to say, value 15a is assumed to exceed a predetermined threshold; and where this occurs, a bit map can be established based on such threshold in a manner illustrated in FIG. 4. Having assigned binary values to the bit map, the edge is defined as illustrated by curve 16 in FIG. 4.

One of the problems with the approach illustrated in FIG. 4 is the manner in which the bit in position 17 in bit map vector 18 is assigned. The precise location of the transition from the printed circuit board, as indicated by measured brightness value 19 to a line indicated by measure value 20, depends on the value at 15A and the size of the pixels. In other words, for a given pixel size, identifying the transition as occuring at location 17 in the bit map rather than at adjacent location 21, depends upon the selected threshold. Note that the pixel size of the grey scale image in the prior art is the same as the pixel size in the bit map.

The present invention contemplates using larger pixels to acquire the grey scale image of the printed circuit board than are used in constructing the bit map while maintaining resolution accuracy. Using relatively large pixels to acquire the data increases the area scanned by the optical system in a given period of time as compared to the approach taken with a conventional device. This also increases the amount of light incident on each pixel in the object thus decreasing the effect of noise due to statistical variations in the amount of light incident on the pixel. Finally, this approach also increases the depth of field because of the larger pixel size accomodating larger deviations in board thickness.

Figure 5:
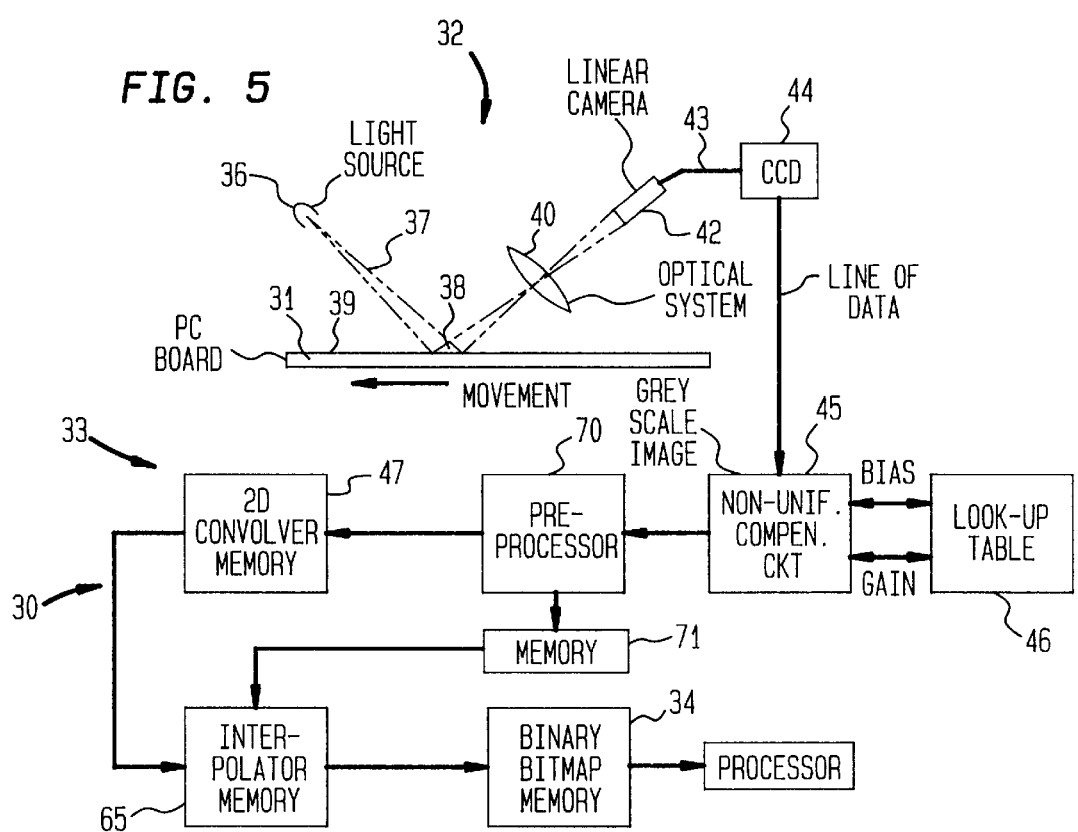
FIG. 5 is a block diagram schematically illustrating the automatic visual inspection system according to the present invention.

Apparatus in accordance with the present invention is designated by reference numeral 30 and is illustrated in FIG. 5 to which reference is now made. Apparatus 30 is designed to produce a binary bit map of printed circuit board 31 which has lines thereon defining edges as shown in FIG. 1. Apparatus 30 comprises a conventional electro-optical sub-system 32 for producing data representative of the brightness of the surface of printed circuit board 31, and processing means 33 for processing the data and producing binary bit map stored in memory 34. Board 31 is mounted for linear displacement in the direction indicated by arrow 35, the mechanism for effecting the movement being conventional and not forming a part of the present invention. For example, moveable tables are available having vacuum tops by which the printed circuit board is clamped for movement by the table.

Linear light source 36, shown in cross-section in FIG. 5, produces high intensity beam 37 which illuminates strip 38 on surface 39 of the printed circuit board, strip 38 being oriented in a direction perpendicular to the direction of movement of the board. Light from the strip is focused by optical system 40 onto a linear array of photodetectors 42 each of whose instantaneous outputs on bus 43 is representative of the number of light photons incident on the photosensitive area of a photodetector. The outputs of the photodetectors are integrated over time, for example, by a linear array of charge-coupled-detectors (CCD's) 44 on which charge is accumulated in proportion to the amount of light incident on the photodetectors, and the time of accumulation which is established by the sampling of the CCD's.

In other words, after a predetermined amount of time dependent upon the intensity of light source 36 and the speed of movement of board 31 and the optical condition of surface 39 of the printed circuit board, each CCD in array 44 will have a charge whose magnitude is proportional to the brightness of an elemental area on strip 38 within the field of view of the particular photodetector connected to the CCD. Upon sampling of the CCD's after such predetermined time, the values of the charges on the linear array of CCD's 44 are transferred, to compensation circuit 45. The arrangement is such that data corresponding to the brightness of each pixel in the object is sequentially examined by compensation circuit 45, and a correction is applied to each value to compensate for individual responses of the various photodiodes in array 42. The need for such compensation arises because the outputs of photodetectors 42, when a uniformly bright object is scanned, will in general, not be equal. The variation in outputs from pixel to pixel in the line of data applied to circuit 45, when the object is uniformly bright, is due to differences in the gain and the response slopes of the photodetectors. By carrying out a calibration process that involves scanning a uniformly bright object, a look-up table of correction factors for the output of each photodetector can be stored in memory 46. In this way, a correction of unavoidable non-uniformities in the illumination and corrections for the bias and the gain differences for the output of each photodetector can be applied to the data being supplied to circuit 45 thus eliminating variations in the electrical responses of the photodetectors.

The output of circuit 45, which is serial, is a representation of the grey scale image of the object, namely surface 39 of board 31. This grey scale image is developed line by line as board 31 is moved with respect to the electro-optical sub-system 32. The function of preprocessor 70 is deferred; and at this time, it is sufficient to state that the digital values of the brightness of the elemental areas of the object are stored in a digital memory that is a part of convolver 47 whose operation is detailed below.

Referring at this time to FIG. 6, sampled data points 48, 49, represent the brightness of pixels on board 11, such pixels being 9-times larger in area than the sampled pixels according to the prior art as shown in FIG. 4. This tripling of the pixel dimension is for purposes of illustrating the present invention and should not be considered as a limitation because the pixel size could be made any multiple of the pixel size shown in FIG. 4. For example, the increase in pixel size could be by a factor of 5 or even 10 times. That is to say, the resolution of the grey scale image obtained according to the present invention is ⅓ or less than the resolution of the grey scale image of a conventional system. Although, as indicated below, the image with the larger pixels appears more blurred than the image with smaller pixels, the processing carried out by convolver 47 properly locates edges of lines on the printed circuit board. However, because the pixel size is increased over that as shown in FIG. 4, the speed of scanning can be increased by the square of the factor that the resolution is decreased, or the amount of light could be reduced and achieve the same scanning rate. In addition, the undersampling achieved with the present invention beneficially effects the field of depth of the optical system with the result that the grey scale image is less sensitive to variations in printed circuit board thickness as different printed circuit boards are scanned, or to variations in height within the same board itself.

Convolver 47 carries out, on the digital data representative of the grey scale image of the printed circuit board, a two-dimensional convolution with the second derivative of a Gaussian function, or an approximation thereof, producing in the associated memory of the convolver, a convolved image of the object having signed values. FIG. 6 shows a one-dimensional convolution of the measured grey scale image represented by data points 48–51 producing the signed values 52–55 shown in FIG. 6. In other words, the convolved one-dimensional image has essentially zero values indicated by data points 52 and 55 at all locations where the brightness of the grey scale image is substantially constant (i.e., regions of the substrate and regions of a line). Thus, the one-dimensional convolved image of the printed circuit board will have values close to zero throughout the image except at the edge of a line. Such an edge is indicated in the one-dimensional convolved image by transitions that have large excursions above and below a zero level as indicated in FIG. 6 by data points 53 and 54. The actual location of the edge is determined by the zero crossing of the signed values of the convolved image. This crossing is closely related to the location where linear curve 56 connecting data points 52–55 crosses the zero axis, the crossing point being indicated by reference numeral 57.

The precise location of the zero crossing need not be determined, only the pixel within which the crossing occurs is necessary. In order to make a direct comparison with the conventional technique illustrated in FIG. 4, the number of pixels in the bit map that will be reproduced using the convolved image is increased to correspond to the number of pixels in the bit map used with the conventional apparatus. Thus, while data points 53 and 54 are measured data points, intermediate points 58, 59, equally spaced between the measured data points, can be found by a linear interpolation operation. The problem of finding the zero crossing is simplified because, as explained below, identification of the pixel in which the zero-crossing occurs is achieved by a comparison of the values of data points 53 and 54.

Reference is now made to FIG. 7 which illustrates the manner in which a comparison is made between the signed data points for the purpose of locating that pixel containing the zero crossing of the convolved image. Recalling that the distance between measured data points is divided into a number of intervals to reduce pixel size in the bit map (in this example, the pixel dimension in the bit map is ⅓ of the dimension in the grey scale image), location of the zero crossing involves identifying that pixel in which the zero crossing occurs. Inspection of FIG. 7 reveals that, by reason of similarity of triangles:

$$A/B=b/(3a-b) \quad (1)$$

where where the quantity A represents the magnitude of the convolved image at 54, B represents the magnitude of the convolved image at data point 53, a represents the dimension of a pixel, and b represents the distance of the zero crossing from data point 54. The object of this exercise is to assign a binary value to bits associated with data points 53 and 54, as well as the two interpolated data points 58 and 59. The binary values for data points 54 and 53 are known and they are ZERO and ONE respectively as shown in FIG. 7. What is unknown is the value associated with the interpolated data points 58 and 59, these values being indicated by the quantities $x_1$ and $x_2$. By inspection of Eq. (1), one an see that if b lies within the interval between zero and a as shown in FIG. 7, then 2A is less than or equal to B. In such case, the zero crossing would occur between data points 54 and 59 and the consequence is that both $x_1$ and $x_2$ should have the binary value 1. similiarly, if A is greater than or equal to 2B, then $x_1=0$ and $x_2=0$. Finally, if B/2<A<2B, then $x_1=0$ and $x_2=1$. The nature of convolving with the derivative of the Gaussian is such that near a zerg-crossing, the convolved image varies linearly. Therefore, the interpolation can be carried out quickly and simply. In order to determine the binary value for the final bit map from the convolved image, two rather simple arithmetic computations are carried out on adjacent oppositely signed values in the convolved image. Assignment of bit map values is dependent upon the inequalities discussed above.

Below curve 56 in FIG. 6 are two binary vectors, the vector at 60 representing the binary values that result from the original grey scale image of the printed circuit board. Vector 61, on the other hand, is obtained using the technique described above using the interpolated pixel values. The combined vectors product the same vector as vector 18 shown in FIG. 4 and also represent the curve 16 as indicated in FIG. 6.

In actual practice, a two-dimensional covolution of the grey scale image with a two-dimensional second derivative (Laplacian) of a Gaussian is carried out. The result is a two-dimensional convolved image of signed values; an interpolation is carried on this convolved image as indicated in FIG. 8 which shows measured data at points designated by circled-pluses, and interpolated data points designated by circled-dots. Interpolation is carried out in orthogonal directions 62–63 and along diagonal 64 which bisects the orthogonal directions. In each case, the interpolation indentifies that pixel within which the zero crossing has occurred in two orthogonal directions and along a diagonal. This process is carried out point-by-point to complete the binary map.

Returning now to FIG. 5, interpolator and memory 65 carries out the operation described above on the two-dimensional convolved image produced by convolver 47. The interpolation process produces binary bit map 34 having pixel sizes that are the same as the binary bit map produced by the conventional approach taken in FIG. 4. However, the binary bit map in FIG. 5 can be obtained almost an order magnitude faster than the bit map following conventional procedures. Moreover, as indicated previously, the sensitivity of the apparatus to variations from board to board, and/or within the same board, to board thickness is less pronounced than in the conventional device because the enlarged pixel size for acquiring the data increases the depth of field of the optical system.

As indicated previously, the signed values of the convolved image are different from essentially zero only adjacent transitions or edges in the object image. No information is contained in the convolved image by which a determination can be made that a pixel containing an essentially zero value is derived from a pixel associated with the substrate or from a pixel associated with a line. Thus, the edges of lines can be accurately determined by the process and apparatus described above, but the attribute of pixels remote from an edge (e.g., pixels farther than the radius of the derivative of the Gaussian operator) is unknown. The purpose of pre-processor 70 is to furnish an attribute to interpolator 65 to enable it to assign a binary value to each bit of the bit map in accordance with whether its corresponding pixel is located in a line or in the substrate. Thus, pre-processor 70 applies to each pixel in the grey scale image a threshold test and stores in associated memory 71 a record that indicates whether the threshold is exceeded. The threshold will be exceeded only for pixels located in a line on the printed circuit board. When convolver 47 produces the convolved image of the grey scale image of the board, the addresses of each pixel lying in a line on the board is available from memory 71. Thus, the attribute of each pixel in the bit map can be established. It is determined directly by the convolution sign near a zero-crossing, and by the threshold test farther away from the zero-crossing. This is because unavoidable variations in contrast which always exist cause the threshold test to be inaccurate. This is particularly true near an edge transition where large variations in contrast exist. In the method described here, therefore, the threshold test is used for only for pixels completely surrounded by dark or light areas. The attributes of pixels near the transition are determined, on the other hand, directly by the convolution sign.

Figure 9:
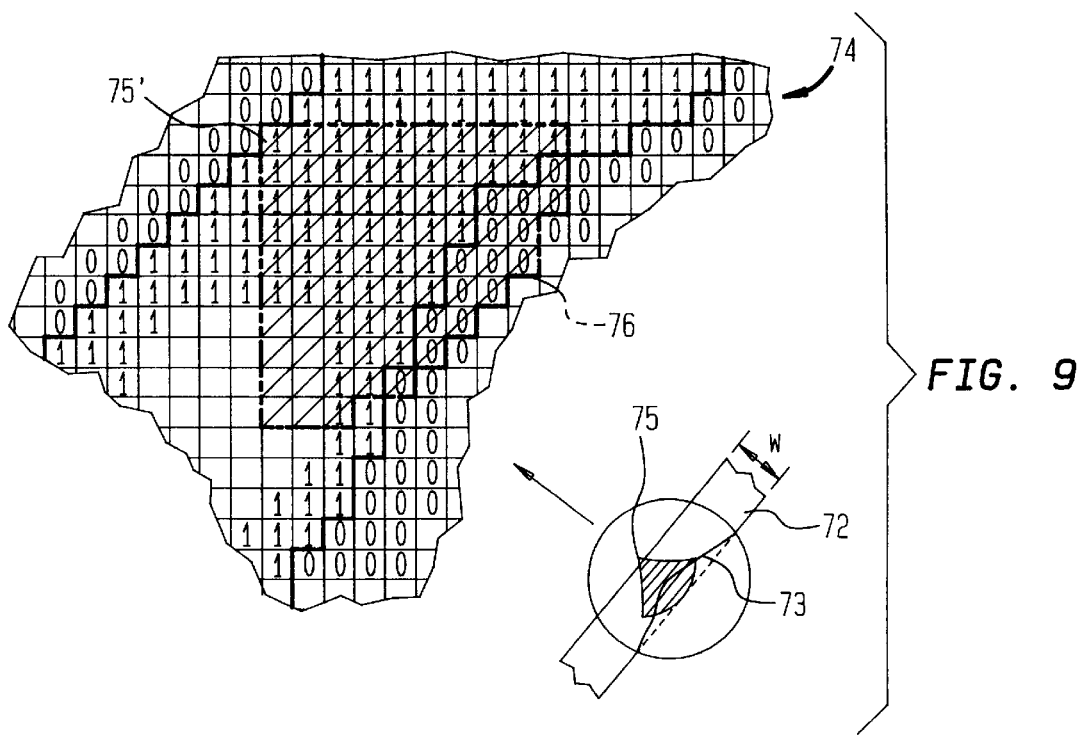
FIG. 9 is an enlarged view of a bit map for the purpose of illustrating a line having a width less than the prescribed width, and the manner in which detection of this defect is Achieved using a quadrant whose radius is equal to the prescribed minimum line width.

The present invention also contemplates determining whether any line on the board has a portion with a thickness less than a predetermined vlaue, regardless of the orientation of the line relative to the axes defining the pixel orientation. This result is achieved in the manner illustrated in FIG. 9 which shows inclined 72 of width w on a board, the line having portion 73 of reduced width of less than a predetermined value. Fragment of bit map 74 shows line 72 as an island of ONE's in a sea of ZERO's. To determine the line width at point 75 on the line, pixel 75' in the bit map is located, and a quadrant of imaginary circle 76 of radius equal to the requited line width is superimposed on the bit map, and apex of the quadrant being positioned at pixel 75'. the circle is defined by address offsets from selected pixel 75'. That is to say, given the address of a pixel on the edge of a line, the addresses of pixels within the boundary of circle 76 is known. If all of the pixels in the bit map within the boundary of circle 76 contain a ONE, then the width of the line at the selected point is no less than the required minimum line width. On the other hand, if any of the pixels within the boundary of circle 76 contain a ZERO, than the width of the line at the selected point is less than the required minimum. Note that the above description applies to line and space orientations between 0° and 90°. A complementary quadrant is used in an entirely analogous manner for orientations between 90° and 180°.

In practice, analysis of line width can be carried out automatically by sequentially applying the principles set forth above to each point on the edge of a line. A record can be made of each pixel in the bit map at which a ZERO detection occurs in the offset addresses, and hence the coordinates of each point on the board having too narrow a line can be determined and stored. It should be noted that the technique disclosed herein is applicable to any line on the board at any orientation.

The principles described above are equally applicable to determining whether the spacing between lines is less than a predetermined minimum. In this case, however, the imaginary circle is placed at at edge of a line such that it overlies the substrate, and the presence of a ONE in the offset addresses indicates reduced spacing.

The convolution function used in the present invention need not be a 2-dimensional function, and the convolution operation need not be carried out in one step. Rather, the function may be the difference of Gaussian functions, one that is positive, and one that is negative. The convolution operation can be carried out in two steps: convolving with the positive Gaussian function, and then convolving with the negative. Implementing this, the effect of convolution can be achieved by multiple convolving a line of data in the grey scale image with a boxcar function in one dimension, and then convolving the 1-dimensional convolved image with a boxcar function in an orthogonal direction.

In order to facilitate two dimensional filtering, or the convolution operation as described above, apparatus 100 shown in FIG. 10 can be utilized. Apparatus 100 accepts a serial data stream from a scanned two dimensional function arranged in rows or columns with k elements per row or per column. Such a signal is generated by a camera as described above.

The operation of apparatus 100 is based on a mathematical theorem that states that a 1-dimensional convolution of a given function with a Gaussian function can be closely approximated by multiple 1-dimensional convolutions of the given function with a boxcar function (i.e., a function that is unity between prescribed limits and zero elsewhere). This procedure is described in Bracewell, R.N. *The Fourier Transform and Its Applications,* McGraw-Hill Inc., 1978, chapter 8. Application of this theorem and its implementation to the grey-scale image of the board is achieved in the present invention by apparatus 100 which comprises a plurality of identical convolver unit modules, only one of which (designated by numeral 101) is shown in detail. Each module accepts a stream of values from a scanned two dimensional function, and performs a partial filtering operation. The output of that module is then fed to the next module for further filtering.

Figure 10:
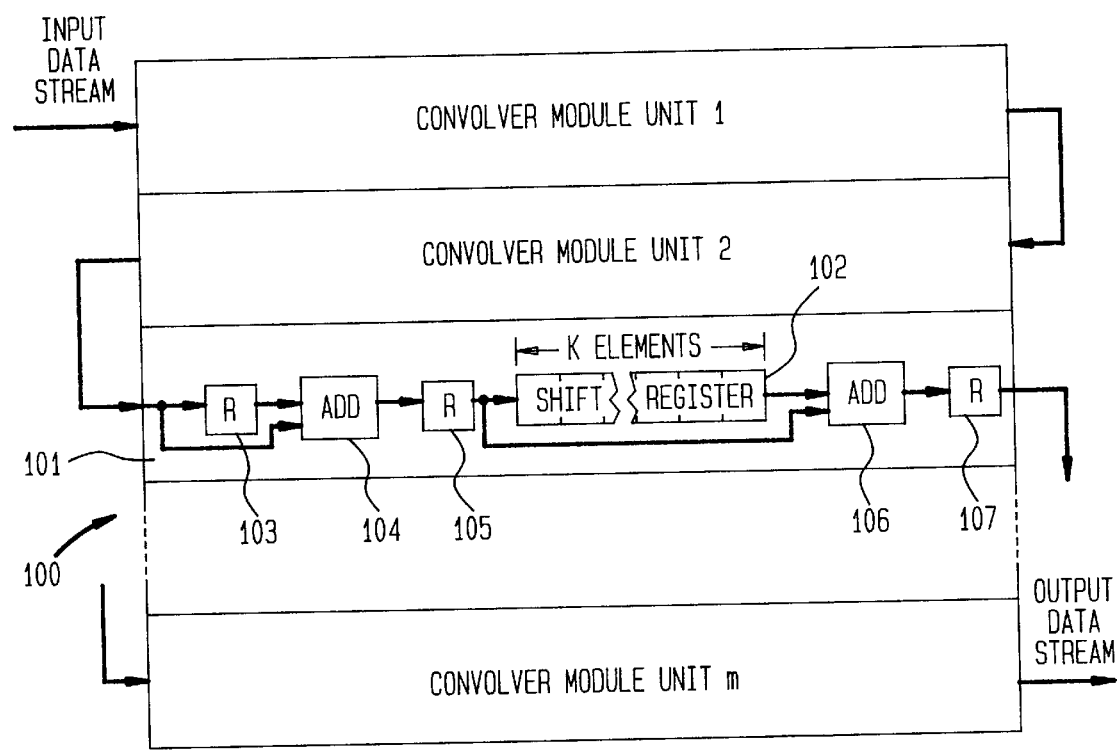
FIG. 10 is a schematic diagram of an one embodiment of apparatus by which a 2-dimensional convolution can be carried out on grey scale image data to form a convolved image.

Each module contains a shift register made of many (e.g., 2048) cells which are fed sequentially with a stream of grey level values from the camera. Under control of pulses from a clock (not shown), the contents of each cell is shifted (to the right as seen in FIG. 10) into the adjacent cell. The first step of the operation is to add two adjacent samples in the input signal to the module. This is achieved by delaying the input signal by one clock period using cell 103 and feeding its output together with the input stream to adder 104 whose output represents the boxcar function. The output of the adder may be delayed by cell 105, which is not essential for the correct operation of the module, but may be included in order to improve speed of operation. The output of cell 105 is down-shifted through shift register 102. Both the input to and the output from shift register 102 are fed into second adder 106 whose output is applied to last cell 107 which outputs the partial result into the next module. This stage completes convolution of the input stream with a two-dimensional boxcar of size 2×2 pixels. Each of cells 103, 105 and 107, and shift register 102, is pulsed by the same clock. Several modules, for example nine, are cascaded in order to perform from required filtering on the input stream applied to convolver unit 1 whose input signal is a scanned two dimensional function of row length of k samples. The output stream from the last cascaded module is a 2-dimensional convolution of the grey scale image.

Figure 11:
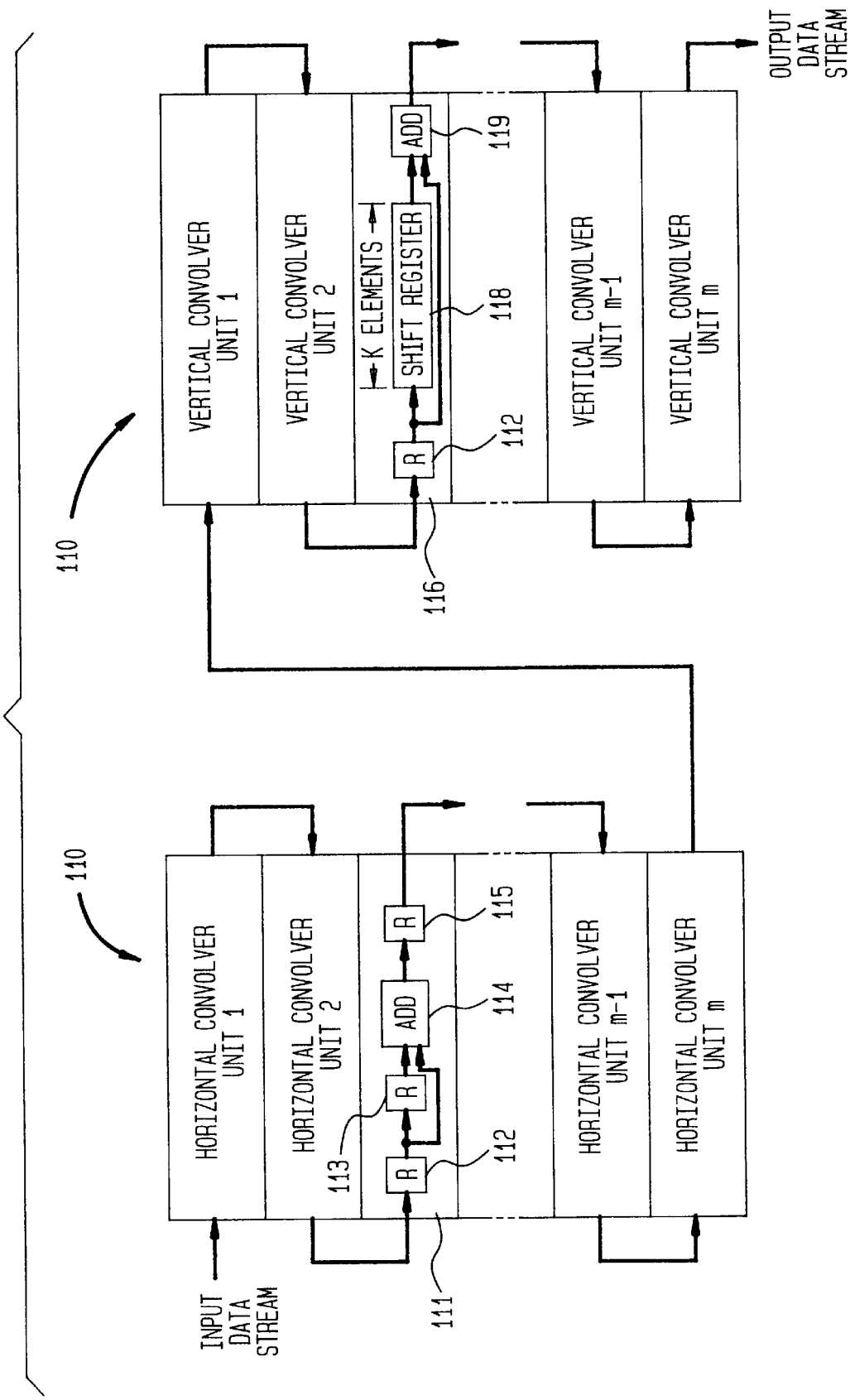
FIG. 11 is another embodiment of convolver.

Another embodiment of convolver, shown in FIG. 11 by reference numeral 110, carries out the same filtering functions as the apparatus shown in FIG. 10, except that the total delay through the circuit is different. Apparatus 110 comprises a plurality of horizontal and vertical convolver units. If the number of horizontal units is made equal to the number of vertical units, a symmetrical convolution is achieved. If the number of units in apparatus 110 is the same as in apparatus 100, the transfer function will be exactly the same except for a fixed delay in the output signal.

The horizontal block of apparatus 110 contains m units, each of which performs partial horizontal filtering or convolution. Two adjacent samples in cells 112 and 113 are summed by adder 114 which represent here the boxcar function. The output of the adder is fed into output cell 115. Cascading many horizontal units performs a 1-dimensional horizontal filtering. The output of the horizontal block is then fed into the vertical block.

The vertical block is made of identical units, each of which performs partial vertical filtering. Apparatus 116 shows one vertical unit. The signal is fed into the input cell 117. The output of that cell is down shifted along the shift register 118. Adder 119 adds the output of the shift register and the output of cell 117. The output of module 116 is fed into the input of the next module. The vertical modules perform a 1-dimensional convolution on the output of the horizontal module, completing in this manner a 2-dimensional convolution on the grey-scale image. All memory cells in the vertical or horizontal units as well as all shift registers are pulsed by a common clock (not shown) feeding the value of each cell into the adjacent cell.

While the above described apparatus performs repeating convolutions with a boxcar function comprised of two adjacent pixels, the convolutions can be achieved using a boxcar function comprising more than two adjacent pixels. This can be achieved, for example, by increasing the number of sampling cells and the number of shift registers, and consequently also increasing the number of inputs entering the adders per module.

As previously indicated, the convolution process requires a 2-dimensional convolution with the differences between Gaussian functions and this can be achieved in the manner indicated in FIGS. 10 and 11, the size of the boxcar function (i.e., its limits along the line of registers) is empirically selected to produce good correspondence between the bit map eventually produced and the actual board. While a line of data in the example described above is said to consist of 2048 pixels, it should be clear that this number is by way of example only and represents the number of photodetectors used in conventional scanning cameras. Furthermore, the 20-pixels window referred to above should also be Considered as being an example because other windows, or even no window at all, can be used.

Finally, while the invention has been described in detail with reference to optical scanning of printed circuit boards, the inventive concept is applicable to other optical scanning problems, and more generally, to any 2-dimensional convolution problem. For example, the invention can be applied to inspecting hybrid boards as well as integrated circuits.

The advantages and improved results furnished by the method and apparatus of the present invention are apparent from the foregoing description of the preferred embodiment of the invention. Various changes and modifications may be made without departing from the spirit and scope of the invention as described in the claims that follow.

I claim:

1. A process for producing a binary map of an object having edges comprising:
    (a) sampling the object to obtain grey level values at discrete sampling points for producing a digital grey scale image of the object with a given resolution; and
    (b) processing the grey scale image to produce a digital map of the object having a resolution greater than said given resolution, such that the location of an edge of the object in the higher resolution map is related by a scale factor to the location of the corresponding edge in the object independently of the relative location of said edge with respect to the locations of said discrete sampling points.

2. A process according to claim 1 wherein the processing includes the step of convolving the digital grey scale image with a filter function that approximates the second derivative of a Gaussian function for forming a convolved image having signed values.

3. A process according to claim 2 wherein the processing includes determining the location of edges in the object by finding zero crossings between adjacent oppositely signed values.

4. A process according to claim 2 wherein the increased resolution of the binary map is achieved by interpolation.

5. A process for producing a binary map of a printed circuit board having conductive traces on a surface of a substrate, the process comprising:
    a) linearly displacing the printed circuit board in a direction perpendicular to a linear array of photosensitive detectors, each of which produces an output that is functionally related to the brightness of the field viewed by the detector;
    b) applying the output of the detectors to a memory having cells for storing, in the cells thereof, a two-dimensional digital grey scale image of the printed circuit board, said image having a predetermined pixel size;
    a) convolving the stored image with a two-dimensional, Laplacian of a Gaussian function for producing a convolved digital image having a signed value for each cell of said memory;
    d) interpolating between adjacent values of opposite sign for obtaining a binary bit map of said printed circuit board with a pixel size smaller than said predetermined size; and
    e) storing said binary bit map in a memory.

6. A process according to claim 5 wherein said Gaussian function is empirically selected in accordance with electrical noise generated by the photosensitive detectors and the traces on the printed circuit board such that the bit map is representative of the traces on the printed circuit board.

7. A process according to claim 5 wherein the convolution is achieved by carrying out a one-dimensional convolution of successive lines of the image to form a one-dimensional convolved image, and carrying out an orthogonal one-dimensional convolution of successive lines of said one-dimensional convolved image to form a two-dimensional convolved image of the printed circuit board.

8. A process according to claim 7 wherein each onedimensional convolved image is formed by multiple convolving with a boxcar function.

9. Apparatus for producing a binary map of an object having edges comprising:
    (a) means for mounting said object so that it is linearly displaceable;
    (b) a light source for illuminating said object;
    (c) a digital memory;
    (d) an electro-optical system responsive to displacement of said object for sampling the light therefrom at discrete sampling points for producing a grey scale image of the object with a given resolution;
    (e) means for storing said grey scale image in said memory; and
    (f) processing means for converting the image in said memory into a binary map of said object having a resolution greater than said given resolution, said processing means being constructed and arranged to cause the location of edges of the object in the higher resolution map to be related by a scale factor to the location of the corresponding edges in the object independently of the relative locations of the edges of the object with respect to said discrete sampling points.

10. Apparatus according to claim 9 wherein said processing means includes a convolver and associated memory for effecting a two-dimensional convolution of the image in said memory with a two-dimensional, second derivative of a Gaussian function, organ approximation thereof, producing in said associated memory, a convolved image of the object having signed values, said convolved image having the same resolution as said grey scale image.

11. Apparatus according to claim 10 wherein said processing means includes an interpolator and associated memory for interpolating between adjacent oppositely signed values in said convolved image for producing said binary map.

12. A process for reducing sensitivity to focusing errors in the binary map of an object having edges comprising:
(a) producing a digital grey scale image of an object by sampling at discrete sampling points, said last mentioned image having a given resolution; and
(b) processing the grey scale image to produce a binary map of the object at a resolution greater than said given resolution, such that the location of edges of the object in the higher resolution map is independent of the location of edges of the object relative to the sampling points.

13. A process for increasing the amount of light in a camera producing a binary map of an object having edges comprising:
(a) producing a digital grey scale image of the object by sampling at discrete sampling points, said last mentioned image having a given resolution; and
(b) processing said grey scale image to produce a binary map of the object at a resolution greater than said given resolution, such that the location of edges of the object in the higher resolution map is independent of the location of the edges relative to the sampling points.

14. Apparatus for producing a binary map of an object having edges comprising:
(a) means for mounting said object so that it is linearly displaceable;
(b) a light source for illuminating said object;
(c) a digital memory;
(d) an electro-optical system responsive to displacement of said object for sampling the light therefrom at discrete sampling points for producing a grey scale image of the object with a given resolution;
(e) means for storing said grey scale image in said memory; and
(f) processing means for converting the image in said memory into a binary map of said object having a resolution greater than said given resolution, said processing means being constructed and arranged to cause the location of edges of the object in the higher resolution map to be related by a scale factor to the location of the corresponding edges in the object independently of the relative locations of the edges of the object with respect to said discrete sampling points;
(g) wherein said electro-optical system is constructed and arranged to produce a stream of data representative of a scanned two-dimensional grey-scale image of the object, and said processing means includes a plurality of convolver modules, and means for applying said stream serially to said modules which are constructed and arranged to produce a two-dimensional convolution of the grey-scale image.

15. Apparatus according to claim 14 wherein said modules include means for convolving an input stream of data with a two-dimensional boxcar function.

16. Apparatus according to claim 15 including an input convolver module having delay means to which said input stream is applied for introducing a unit delay in the stream and producing a delayed stream, an adder for adding the input stream to the delayed stream and producing an added stream, a shift register to which the added stream is applied for producing a shifted stream, and means for combining the shifted stream with the added stream and producing a combined stream.

17. Apparatus according to claim 16 including an intermediate convolver module having delay means to which said combined stream is applied for introducing a unit delay in the stream and producing a delayed stream, an adder for adding the input stream to the delayed stream and producing an added stream, a shift register to which the added stream is applied for producing a shifted stream, and means for combining the shifted stream with the added stream and producing a combined stream.

18. Apparatus according to claim 16 including an output module having delay means to which s combined stream is applied for introducing a unit delay in the stream and producing a delayed stream, an adder for adding the input stream to the delayed stream and producing an added stream, a shift register to which the added stream is applied for producing a shifted stream, and means for combining the shifted stream with the added stream and producing an output stream representative of a two-dimensional convolution of the input stream with a boxcar function.

19. Apparatus according to claim 15 wherein said modules include a plurality of horizontal convolver units for carrying out a first one-dimensional convolution on said input stream and producing a first one-dimensional convolved stream, and a plurality of vertical convolver units for carrying out a second one-dimensional convolution on said first convolved stream orthogonal to the first convolution and producing a two-dimensional convolution of said input stream.

20. A convolver module for convolving an input stream of data comprising:
a) delay means for delaying said input stream and producing a delayed stream;
b) an adder for adding the input stream to the delayed stream and producing an added stream;
c) a shift register to which the added stream is applied for producing a shifted stream; and
d) means for combining the shifted stream with the added stream and producing an output stream representative of a two-dimensional convolution of the input stream with a boxcar function.

21. A process according to claim 1 wherein the processing step is carried out such that the relationship of the edges in the higher resolution map to the corresponding edges in the object is limited only by noise and pixel size.

22. A process for producing a binary map of an object having edges comprising:
a) scanning the object to produce a digital grey scale image of the object with a given resolution, said image having pixels of predetermined size; and
b) processing the grey scale image to produce a digital map of the object having a resolution greater than said given resolution such that the location of edges in the grey scale image are substantially independent of the relationship between the edges of the object and the direction of scanning.

23. Apparatus for producing a binary map of an object having edges comprising:
(a) means for mounting said object so that it is linearly displaceable;
(b) a light source for illuminating said object;

(c) a digital memory;

(d) an electro-optical system responsive to displacement of said object for converting the light therefrom to a grey scale image of the object with a given resolution;

(e) processing means for converting the image in said memory into a binary map of said object having a resolution greater than a given resolution, and having pixels of a predetermined size; and (f) said processing means being constructed and arranged to cause the relationship between the edges of the pixel of the grey scale image to be independent of the actual edges of the object.

24. Apparatus for detecting an edge of an object comprising:

(a) scan means to scan the object along a scan line that intersects said edge for obtaining a plurality of grey scale level values at discrete sampling points; and (b) processing means to process said values for locating the intersection of said scan line with said edge such that the location of said intersection is independent of the relationship between said sampling points and said edge.

25. Apparatus according to claim 24 wherein said scan means is constructed and arranged to scan the object along a plurality of displaced scan lines for obtaining a digital grey scale image of the object, and wherein said processing means includes a convolver for convolving the digital grey scale image of the object into a convolved image of the object having signed values, said convolver convolving the grey scale image with a filter function that produces a predetermined value in the convolved image at edge locations of the object.

26. Apparatus according to claim 25 wherein said processing means includes means for detecting said predetermined value to thereby locate the edges of the object in the convolved image.

27. Apparatus according to claim 25 wherein said filter function is the second derivative of a Gaussian function.

28. Apparatus according to claim 25 wherein said filter function is an approximation of the second derivative of a Gaussian function.

29. Apparatus according to claim 28 wherein said processing means includes means for detecting zero crossings between adjacent oppositely signed values in said convolved image, the location of said zero crossings of said convolved image being the location of edges in said object.

30. A process according to claim 22 wherein said processing step includes convolving the grey scale image with a filter function into a convolved image having signed values, said filter function being selected such that a predetermined value in the convolved image is produced at edge locations on the object.

31. A process according to claim 30 wherein said predetermined value is zero.

32. A process according to claim 31 wherein said process includes the step of detecting values of zero in the convolved image.

33. A process according to claim 30 wherein said filter function approximates the second derivative of a Gaussian function.

34. A process according to claim 33 wherein said predetermined value is zero, and including the step of detecting zero crossings between adjacent signed values in said convolved image, the location of said zero crossings being the location of edges in said object.

35. A method for detecting an edge of an object comprising the steps of:

(a) scanning the object along a scan line that intersects said edge for obtaining a plurality of grey scale level values at discrete sampling points; and (b) processing the values of the scan line for locating the intersection of said scan line with said edge such that the location of said intersection is independent of the relationship between said sampling points and said edge.

36. A method according to claim 35 including the step of scanning the object along a plurality of displaced scan lines for obtaining a digital grey scale image of the object, and convolving the digital grey scale image of the object into a convolved image of the object having signed values using a filter function that produces a predetermined value in the convolved image at edge locations of the object.

37. A method according to claim 36 including the step of detecting said predetermined value to thereby locate the edges of the object in the convolved image.

38. A method according to claim 36 wherein said filter function is the second derivative of a Gaussian function.

39. A method according to claim 36 wherein said filter function is an approximation of the second derivative of a Gaussian function.

40. A method according to claim 39 including the step of detecting zero crossings between adjacent oppositely signed values in said convolved image, the location of said zero crossings of said convolved image being the location of edges in said object.

41. A process for producing a binary map of an object having edges comprising:

(a) scanning the object in a given direction to obtain grey level values at discrete sampling points for producing a digital grey scale image of the object with a given resolution; and (b) processing the grey scale image to produce a digital map of the object having a resolution greater than said given resolution, such that the location of an edge of the object in the higher resolution map is independent of the relative location of said edge with respect to the locations of said discrete sampling points, and of the direction of scanning.

42. A process according to claim 41 wherein the processing includes the step of convolving the digital grey scale image with a filter function that approximates the second derivative of a Gaussian function for forming a convolved image having signed values.

43. A process according to claim 42 wherein the processing includes determining the location of edges in the object by finding zero crossings between adjacent oppositely signed values.

44. A process according to claim 42 wherein the increased resolution of the binary map is achieved by interpolation.

45. A process for producing a binary map of an object having edges, the process comprising:

a) displacing the object relative to a linear array of photosensitive detectors each of which produces an output that is functionally related to the brightness of the field viewed by the detector;

b) applying the output of the detectors to a memory for storing, in the cells thereof, a two-dimensional digital grey scale image of the object, said image having a predetermined pixel size;

c) convolving the stored image with a filter function that approximates the second derivative of a Gaussian function for producing a convolved digital image having a signed value for each cell of said memory;

d) interpolating between adjacent values of opposite sign for obtaining a binary bit map of said object with a pixel size smaller than said predetermined size; and e) storing said binary bit map in a memory.

46. A process according to claim 45 wherein said filter function is empirically selected in accordance with electrical noise generated by the photosensitive detectors and the pattern of edges in the object such that the bit map is representative of the edges in the object.

47. A process according to claim 45 wherein the convolution is achieved by carrying out a one-dimensional convolution of successive lines of the image to form a one-dimensional convolved image, and carrying out an orthogonal one-dimensional convolution of successive lines of said one-dimensional convolved image to form a two-dimensional convolved image of object.

48. A process according to claim 47 wherein each one-dimensional convolved image is formed by multiple convolving with a boxcar function.

49. A process according to claim 45 wherein said filter function is a two-dimensional Laplacian of a Gaussian function.

50. Apparatus for producing a binary map of an object having edges comprising:

(a) means for scanning the object in a given direction to obtain grey level values at discrete sampling points for producing a digital grey scale image of the object with a given resolution; and (b) means for processing the grey scale image to produce a digital map of the object having a resolution greater than said given resolution, such that the location of an edge of the object in the higher resolution map is independent of the relative location of said edge with respect to the locations of said discrete sampling points, and of the direction of scanning.

51. Apparatus according to claim 50 wherein said means for processing includes means for convolving the digital grey scale image with a filter function that approximates the second derivative of a Gaussian function for forming a convolved image having signed values.

52. Apparatus according to claim 51 wherein said means for processing includes means for determining the location of edges in the object by finding zero crossings between adjacent oppositely signed values.

53. Apparatus according to claim 51 wherein said means for processing includes means for interpolating to increase the resolution of the binary map.

54. Apparatus for producing a binary map of an object having edges comprising:

a) a linear array of photosensitive detectors each of which produces an output that is functionally related to the brightness of the field viewed by the detector;

b) means for relatively displacing the object and the array;

c) means for applying the output of the detectors to a memory for storing, in the cells thereof, a two-dimensional digital grey scale image of the object, said image having a predetermined pixel size;

d) means for convolving the stored image with a filter function that approximates the second derivative of a Gaussian function for producing a convolved digital image having a signed value for each cell of said memory;

d) interpolating between adjacent values of opposite sign for obtaining a binary bit map of said object with a pixel size smaller than said predetermined size; and e) a memory for storing said binary bit map.

55. Apparatus according to claim 54 wherein said filter function is empirically selected in accordance with electrical noise generated by the photosensitive detectors and the pattern of edges in the object such that the bit map is representative of the edges in the object.

56. Apparatus for producing a binary map of an object having edges comprising:

a) a light source for illuminating said object;

b) an electro-optical system for sampling light from said object;

c) means for effecting relative movement between said object and said system;

d) means responsive to said relative movement for sampling light from discrete sampling points on the object and producing a grey scale image of the object with a given resolution;

e) means for storing said grey scale image in a digital memory; and f) processing means for converting the image in said memory into a binary map of said object having a resolution greater than said given resolution, said processing means being constructed and arranged to cause the location of the edges of the object in the higher resolution map to be related by a scale factor to the location of the corresponding edges in the object independently of the relative locations of the edges of the object with respect to said discrete sampling points;

g) wherein said electro-optical system produces a stream of data representative of a scanned two-dimensional grey-scale image of said object, and said processing means includes a convolver, and means for applying said stream serially to said convolver which is responsive to produce a two-dimensional convolution of the grey-scale image.

57. Apparatus according to claim 56 wherein said convolver performs a convolution operation using a filter function that approximates the second derivative of a Gaussian function.

58. Apparatus according to claim 57 wherein said filter function is a two-dimensional Laplacian of a Gaussian function.

59. A process for producing a binary map of an object having edges, the process comprising:

a) effecting relative displacement between said object and a linear array of photosensitive detectors, each of which produces an output that is functionally related to the brightness of the field viewed by the detector;

b) applying the output of the detectors to a memory having cells for storing, in the cells thereof, a two-dimensional digital grey scale image of the printed circuit board, said image having a predetermined pixel size;

c) convolving the stored image with a filter function that approximates the second derivative of a Gaussian function for producing a convolved digital image having a signed value for each cell of said memory;

d) interpolating between adjacent values of opposite sign for obtaining a binary bit map of said object with a pixel size smaller than said predetermined size; and e) storing said binary bit map in a memory.

60. A process according to claim 59 wherein said filter function is empirically selected in accordance with electrical noise generated by the photosensitive detectors and the edges in the object such that the bit map is representative of the edges in the object.

61. A process according to claim 59 wherein the convolution is achieved by carrying out a one-dimensional convolution of successive lines of the image to form a one-dimensional convolved image, and carrying out an orthogonal one-dimensional convolution of successive lines of said one-dimensional convolved image to form a two-dimensional convolved image of the printed circuit board.

62. A process according to claim 60 wherein each one-dimensional convolved image is formed by multiple convolving with a boxcar function.

63. A process according to claim 59 wherein said filter function is a two-dimensional Laplacian of a Gaussian function.

64. Apparatus according to claim 50 wherein said means for processing includes means for convolving the digital grey scale image with a filter function of the type that forms a convolved image having signed values.

65. Apparatus according to claim 50 wherein said means for processing includes means for convolving the digital grey scale image with a filter function of the type in the form of first and second directional derivatives of a Gaussian function for forming a convolved image having signed values.

66. A process for producing a binary map of an object having edges comprising:

(a) sampling the object to obtain grey level values at discrete sampling points for producing a digital grey scale image of the object with a given resolution;

(b) convolving the grey scale image with a filter function to produce a digital map of the object having a resolution greater than said given resolution; and (c) selecting the filter function such that edges in the digital map corresponding to edges in the object are substantially independent of the location of the sampling points relative to the edges in the object.

67. Apparatus for producing a binary map of an object having edges comprising:

(a) means for mounting said object so that it is linearly displaceable;

(b) a light source for illuminating said object;

(c) a digital memory;

(d) an electro-optical system responsive to displacement of said object for sampling the light therefrom at discrete sampling points for producing a grey scale image of the object with a given resolution;

(e) means for storing said grey scale image in said memory; and (f) means for convolving the image in said memory with a filter function to produce a binary map of said object having a resolution greater than said given resolution, said filter function causing edges in the binary map corresponding to edges in the object to be substantially independent of the location of the sample points relative to the edges in the object.

* * * * *